US008214912B2

(12) United States Patent
Lee et al.

(10) Patent No.: US 8,214,912 B2
(45) Date of Patent: Jul. 3, 2012

(54) METHOD AND APPARATUS FOR TEMPORARILY USING DRM CONTENTS

(75) Inventors: Jae-won Lee, Yongin-si (KR); Seung-chul Chae, Suwon-si (KR); Young-suk Jang, Uijeongbu-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 950 days.

(21) Appl. No.: 11/657,594

(22) Filed: Jan. 25, 2007

(65) Prior Publication Data

US 2007/0192276 A1     Aug. 16, 2007

(30) Foreign Application Priority Data

Jan. 31, 2006   (KR) .................. 10-2006-0009344

(51) Int. Cl.
*H04N 7/16*   (2011.01)
*G06F 21/00*  (2006.01)
(52) U.S. Cl. ............... 726/30; 726/31; 705/57; 705/59; 705/52
(58) Field of Classification Search .............. 726/27, 726/31, 26, 30; 705/59, 57, 51, 52, 54; 707/1, 707/9, 10
See application file for complete search history.

(56) References Cited

U.S. PATENT DOCUMENTS

| | | | | |
|---|---|---|---|---|
| 6,865,555 B2* | 3/2005 | Novak | .............................. | 705/59 |
| 7,103,663 B2* | 9/2006 | Inoue et al. | ..................... | 709/225 |
| 7,203,966 B2* | 4/2007 | Abburi et al. | .................... | 726/29 |
| 7,483,958 B1* | 1/2009 | Elabbady et al. | ............... | 709/217 |
| 7,676,846 B2* | 3/2010 | Robert et al. | ..................... | 726/27 |
| 7,801,819 B2* | 9/2010 | Swenson et al. | ................. | 705/52 |
| 7,801,820 B2* | 9/2010 | Molaro | ............................ | 705/59 |
| 8,010,984 B2* | 8/2011 | Thukral | ........................... | 725/86 |
| 2004/0249815 A1* | 12/2004 | Lee | .................................... | 707/9 |
| 2005/0004873 A1* | 1/2005 | Pou et al. | ......................... | 705/51 |
| 2005/0198510 A1* | 9/2005 | Robert et al. | .................... | 713/175 |
| 2006/0080453 A1* | 4/2006 | Thukral | ......................... | 709/231 |
| 2006/0106726 A1* | 5/2006 | Raley et al. | ...................... | 705/59 |
| 2006/0229936 A1* | 10/2006 | Cahill | ............................. | 705/14 |

FOREIGN PATENT DOCUMENTS

| | | |
|---|---|---|
| EP | 1271279 A2 * | 1/2003 |
| JP | 2004-227283 A | 8/2004 |
| JP | 2004-303111 A | 10/2004 |
| JP | 2005-166059 A | 6/2005 |
| JP | 2007-534053 A | 11/2007 |
| KR | 10-2004-0107602 A | 12/2004 |
| KR | 10-2005-0084386 A | 8/2005 |
| KR | 10-2005-0088518 A | 9/2005 |
| WO | 2005/093545 A1 | 10/2005 |
| WO | 2005096541 A1 | 10/2005 |

* cited by examiner

*Primary Examiner* — Zachary A Davis
(74) *Attorney, Agent, or Firm* — Sughrue Mion, PLLC

(57) ABSTRACT

A method and apparatus for temporarily using Digital Rights Management (DRM) contents is provided. The method includes receiving a rights object having information required for using the contents, converting the rights object into a first temporary rights object and a second temporary rights object for a temporary use of the contents, and transmitting the first temporary rights object and the second temporary rights object to an unauthorized device. The first temporary rights object and the second temporary rights object are the rights objects that allow using the contents for a predetermined time.

16 Claims, 7 Drawing Sheets

METHOD AND APPARATUS FOR TEMPORARILY USING DRM CONTENTS

CROSS REFERENCE TO RELATED APPLICATION

This application claims priority from Korean Patent Application No. 10-2006-0009344 filed on Jan. 31, 2006 in the Korean Intellectual Property Office, the disclosure of which is incorporated herein by reference in its entirety.

BACKGROUND OF THE INVENTION

1. Field of the Invention

The present invention relates to a method and apparatus for using DRM (Digital Rights Management) contents, and more particularly, to a method and apparatus for temporarily sharing DRM contents.

2. Description of the Related Art

Open Mobile Alliance (OMA) DRM defines a domain as a logical collection that shares one domain key. The domain key is generated by a server and is distributed to individual devices in a domain registration process. The devices that share the domain key receive a rights object (RO) that is encrypted by the domain key, such that terminals belonging to the domain can share contents. If a device is taken out of the domain, the domain key is updated, and this update is reported to all the devices. Then, the contents are redistributed.

A home domain has a domain manager that manages the domain and general DRM devices. In general, the domain manager serves as a master and the general devices serve as slave or guest devices. The domain manager searches the guest devices, performs authentication, and registers the domain key. The domain key is generated by the domain manager. Then, the domain is formed.

The domain has a server that involves in forming the domain, and a user selects devices to be registered in his/her domain among devices that present on the server. The server transfers a certificate revocation list downloaded from an external server to the devices selected by the user. The certificate revocation list includes information for identifying devices revoked by a broadcast encryption system.

Each of the devices creates a certificate for the public key using a secret value extracted from the certificate revocation list transferred from the server and transfers the certificate to the server. The server verifies the legitimacy of the devices through the certificate verification, and unique IDs and the public keys of the authenticated devices are stored in an authentication list. Further, the server generates a unique domain ID and a domain key using the unique IDs and the public keys of the devices in the authentication lists and a random number. At this time, the random number is generated by the server. Then, the domain key and the domain ID that are encrypted by the public keys of the individual devices are transferred to the devices in the authenticated domain.

To this end, the following procedure is taken.
1. The master device and the guest device to be used are turned on.
2. If the master device is turned on and is connected to a home domain network, the authentication is performed on whether or not the devices connected to the network are legal devices.
3. After the devices are authenticated, the user registers the devices in a list of the master in order to register the device in the home domain.
4. When a device is added or deleted, a new domain key is generated.
5. The registered guest devices are subject to a mode change as slave devices.
6. All the slave devices safely receive the new domain key.

According to this procedure, whenever a new device is added or deleted, this needs to be registered in the server, which causes overhead. Accordingly, it is impossible to freely share the contents.

FIG. 1 is a diagram showing an operation for generating and distributing a rights object on the contents that is provided in a related art OMA DRM architecture. Various devices D1, D2, D3, and D4 in the domain are registered as members of the domain through a registration procedure to a service provider. Then, the individual devices D1, D2, D3, and D4 can share the contents and the rights object with other devices.

Here, one representative device D1 can transmit the acquired contents and rights object to other devices D2, D3, and D4 so as to share the contents and the rights object with other devices. Then, the other devices can reliably use information of the received contents and rights object on the basis of information of the service provider.

A general DRM system transmits the contents encrypted by a contents provider or a rights issuer in order to protect the contents from illegal usage. In addition, in order to protect the use of the contents, a rights object including usage rules of the contents is issued so as to protect the rights of the original author. To this end, the DRM devices are designed to forcibly keep the usage rules included in the rights object.

In the OMA DRM architecture v2.0, rights information (that is, RO) of the contents is shared using the domain. The procedure is as shown in FIG. 1.

First, four devices exists in one domain, and, in a server-based domain technique, a contents server includes a root certificate and a service provider certificate for generating a rights object including encrypted contents, an encryption key for using the encrypted contents, and usage rules. The root certificate is a certificate of a certificate issuer for confirming an authenticating system, and the service provider certificate is a certificate for representing that the public key of the service provider is authenticated from the certificate issuer.

Referring to the flow of FIG. 1, the devices D1, D2, and D3 are registered to the rights issuer and join in the domain (1). The device D1 acquires the contents and rights object from the rights issuer (2), and transmits the acquired contents and rights object to the devices D2 and D3 (3). Meanwhile, even though the device D1 transmits the contents and the rights object to the device D4, as shown in (4), since the device D4 is not registered to the rights issuer yet, a process (5) of allowing the device D4 to be registered to the rights issuer and to join in the domain is required.

Accordingly, there is a need for a method and an apparatus that enable the rights object to be freely used among the devices belonging to the same domain, thereby enabling the usage of the contents with no interruption.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus which allow a contents owner to share contents, which is permitted to be shared by a rights issuer, such that the contents can be used by other users, and to provide temporary usage right in a DRM system.

The present invention also provides a method and apparatus which allow a contents owner to directly provide a usage right with no additional operation of a rights issuer, to limit to use the usage right provided, and to limit a user to share the usage right of the contents with other users.

According to an aspect of the invention, a method of temporarily using DRM contents includes receiving a rights object including information required for using the contents, converting the rights object into a first temporary rights object and a second temporary rights object such that the contents are temporarily used, and transmitting the first temporary rights object and the second temporary rights object to an unauthorized device. The first temporary rights object and the second temporary rights object are rights X objects that use the contents for a predetermined time.

According to another aspect of the invention, an apparatus includes a receiving unit which receives a rights object having information required for using contents, a rights object generating unit which converts the rights object into a first temporary rights object and a second temporary rights object such that the contents are temporarily used, a control unit which performs a control such that an unauthorized device uses the first temporary rights object and the second temporary rights object, and a transmitting unit which transmits the first temporary rights object and the second temporary rights object to the unauthorized device according to the control of the control unit. The first temporary rights object and the second temporary rights object are the rights objects that allow using the contents for a predetermined time.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS OF THE INVENTION

Figure 1:
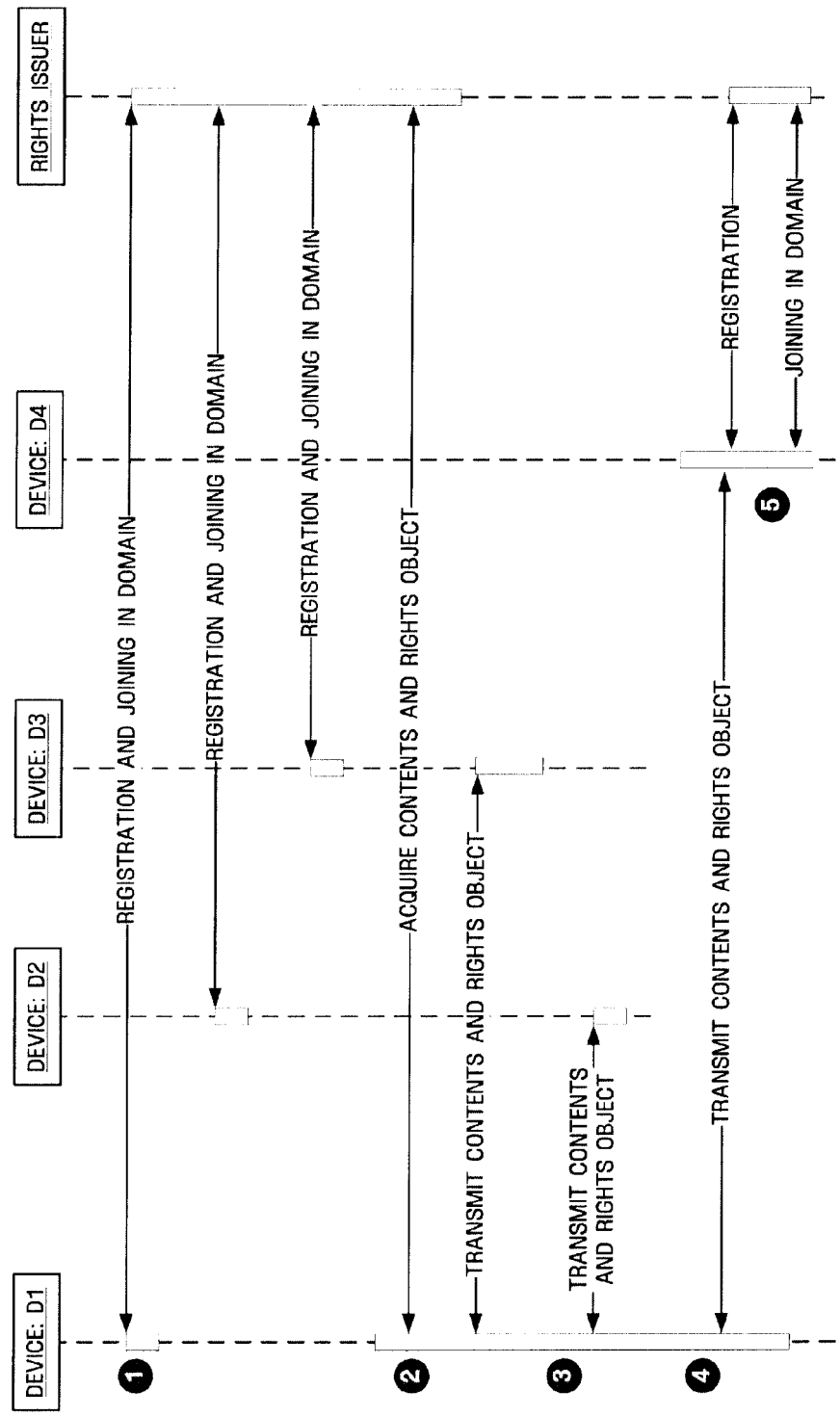
FIG. 1 is a diagram showing an operation for generating and distributing rights objects on contents that is provided in a related art OMA DRM architecture.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will be described hereinafter with reference to block diagrams or flowchart illustrations of a method and an apparatus for temporally using DRM contents according to an exemplary embodiment thereof. It will be understood that each block of the flowchart illustrations and combinations of blocks in the flowchart illustrations can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And, each block of the block diagrams may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order depending upon the functionality involved.

In the specification, a description will be given by way of play among various usage methods or consuming methods of contents. However, the invention is not limited to this example, but may be applied to various usage methods, such as copy or output of the contents. Consumption of contents means the use of the contents.

In the specification, a contents owner is allowed to share contents permitted to be shared by a rights issuer, such that the contents can be used by other users, and to provide temporary usage right in a DRM system. In addition, the contents owner is allowed to directly provide the usage right with no additional action of the rights issuer, to limit a user to use the temporary usage right when the user lost the temporary usage right, and to limit the user's ability to share the temporary usage right to use the contents with other users.

Figure 2:
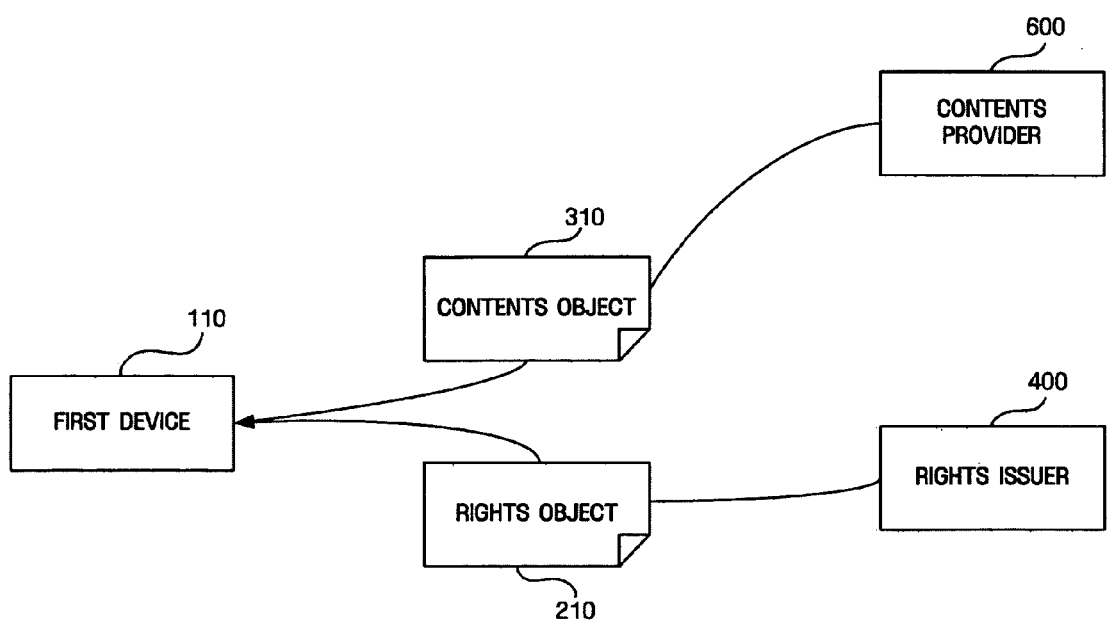
FIG. 2 is a diagram showing a process by which a representative device receives rights objects and contents according to an exemplary embodiment of the invention.

FIG. 2 is a diagram showing a process by which a representative device 110 receives rights objects and contents according to an exemplary embodiment of the invention.

A contents provider 600 transmits a contents object 310 to a representative device, that is, a first device 110. In the specification, the representative device means a device that transmits the contents object to other devices or converts the rights object so as to be temporarily used and transmits the converted rights object.

A right issuer 400 transmits an appropriate usage rights object 210 for the contents object 310, and the first device 110 receives the rights object 210 and stores the rights object 210 in its internal storage unit.

Figure 3:
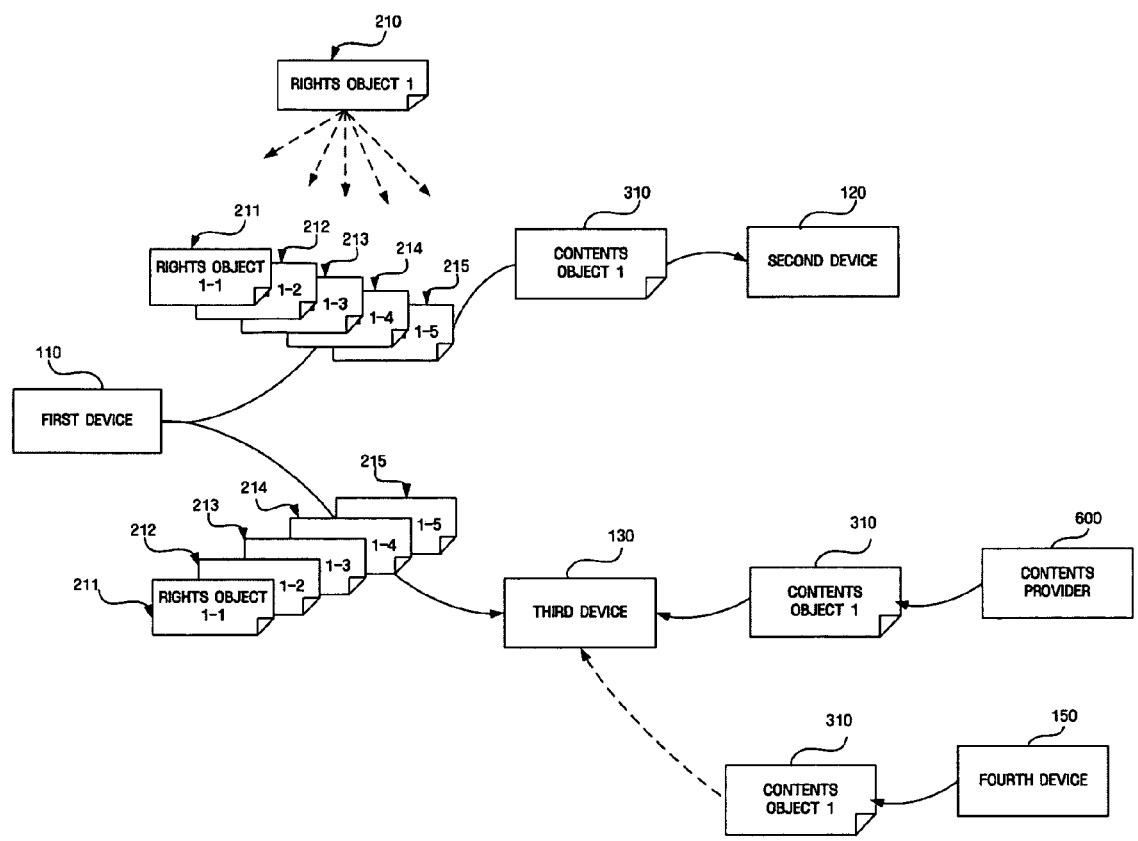
FIG. 3 is a diagram showing a process by which a representative device transmits rights objects to other devices according to an exemplary embodiment of the invention.

FIG. 3 is a diagram showing a process by which the representative device transmits the rights object to other devices according to the exemplary embodiment of the invention.

A second device 120 receives the contents object 310 from the first device 110, and a third device 130 receives the same contents object 310 from the contents provider 600 or a fourth device 150. The second device 120 and the third device 130 do not receive the usage rights object for the contents object 310 from the rights issuer (not shown), but receive a temporary usage right from the first device 110. In the specification, the second device 120 or the third device 130 is an unauthorized device that does not have a right to use the rights object.

Temporary usage rights objects 211, 212, 213, 214, and 215 are converted from the original rights object 210 by the first device 110, such that the contents object 310 can be used for a short time. The first device 110 transmits a series of converted temporary usage rights objects to the second device 120 or the third device 130. According to the exemplary embodiments, the temporary usage rights objects may be transmitted, together with the contents object 310 (in a case of the second device). Alternatively, a device can receive from the contents object 310 from the fourth device 150 or directly from the contents provider 600 (in a case of the third device).

As shown in FIG. 3, the second device 120 and the third device 130 receive the transmitted usage right for the contents object 310 from the first device 110, and play and use the contents object 310 within the limit of the granted right. At this time, the first device 110 grants only a temporary usage right when granting the usage right for the contents object 310 to the second device 120 and the third device 130 not to be against to the interests of the contents provider 600.

The first device 110 provides the temporary usage right to the devices 120 and 130 which, for example, belong to a domain that is previously verified or belong to a domain of the same user so as to improve convenience of usage. The verification means that the domain passed through authentication. Further, it means that the contents can be used by devices of other users within the limit of contents protection.

Figure 4:
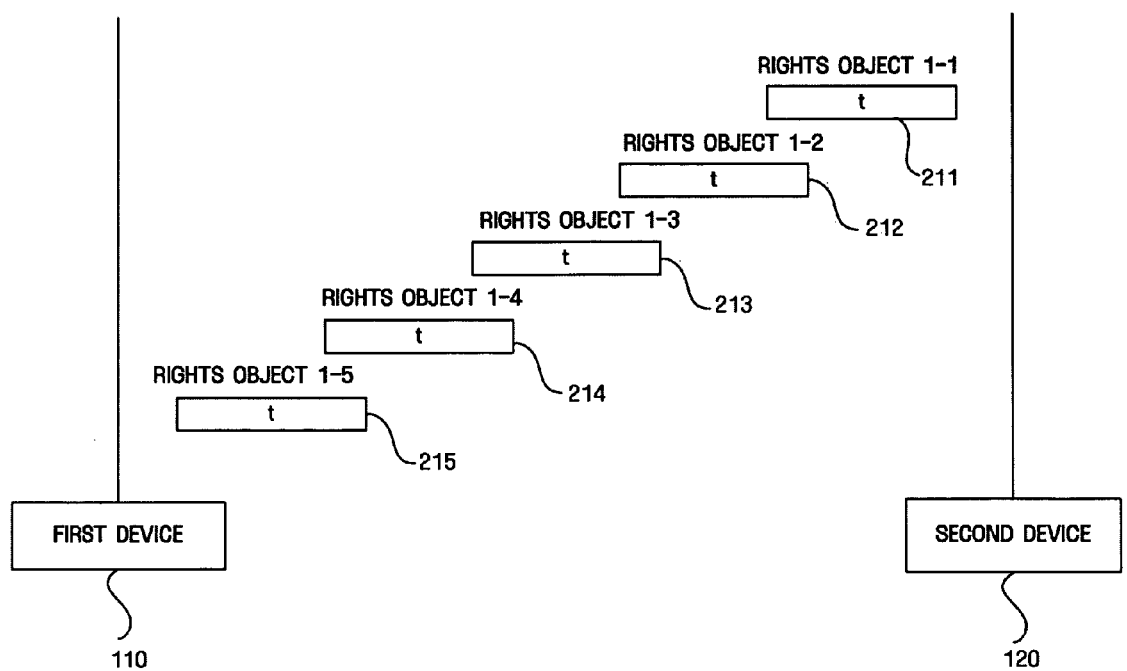
FIG. 4 is a diagram showing a time interval of usage of rights objects according to an exemplary embodiment of the invention.

FIG. 4 is a diagram showing a time interval of usage of the rights objects according to an exemplary embodiment of the invention. N temporary rights objects are generated by converting the original rights object such that the contents can be used for a predetermined time only upon the usage of the contents. In FIG. 4, five rights objects are used.

The first device 110 transmits the temporary rights objects, i.e., a rights object 211 to a rights object 215. The individual rights objects allow the contents to be used for a time t. In this case, the rights objects cannot be reused. The second device 120 plays the contents for a first time t using the rights object 211, and then uses the rights object 212 to play the contents for a next time t. Subsequently, the contents can be played for a time t using the rights object 213, the rights object 214, and the rights object 215. Of course, all the rights objects do not necessarily provide the usage right for a predetermined time, for example, the time t. With one or a small number of rights objects, the play of the contents can be actually permitted for a short time (for example, ten or five seconds). FIG. 4 shows just an example. The contents usage time may vary according to the rights objects. If a network condition is good and a processing speed of the rights object is fast, play rights objects for a short time of less than one second can be successively provided.

The second device 120 can no longer use the transmitted temporary rights object after the temporary rights objects are used, and thus the contents can be protected. The contents can be used by setting a period in the temporary rights object. Then, with this information, the expired temporary rights object can be set as not available for contents play. When the play time of the contents object is N seconds, and the usage time of the rights object 212 or 213 is t seconds, N/t or more rights objects are required.

In FIG. 4, the first device 110 generates the successive temporary rights objects 211, 212, 213, 214, 215 having play rights for the time t such that the second device 120 successively use the contents object. Further, the first device 110 provides a next rights object before the time t passes after a previous rights object reaches the second device 120. The time t can be set longer than a time until the first device 110 generates and transmits the rights object or until the second device 120 receives and analyzes the rights object.

The first device 110 may stop providing the rights objects in order to suspend the usage right for the contents object of the second device 120, such that the usage can be stopped immediately after the usage period of the final rights object is expired. At this time, the second device 120 cannot reuse the previous rights object.

The first device 110 can limit the scope of the usage right to be shared by limiting a transmission medium of the temporary rights object to the second device 120. For example, if rights object transmission is limited to infrared transmission, a spatial scope of the usage right to be shared within an infrared range can be limited.

The user of the first device 110 can temporarily provide the usage right of his/her contents to the user of the second device 120. Accordingly, the user of the second device 120 should not feel inconvenience in that he/she does not need to receive the usage right from a remote server. Further, since the period of the usage right is limited, the interests of the contents provider are not damaged.

Figure 5:
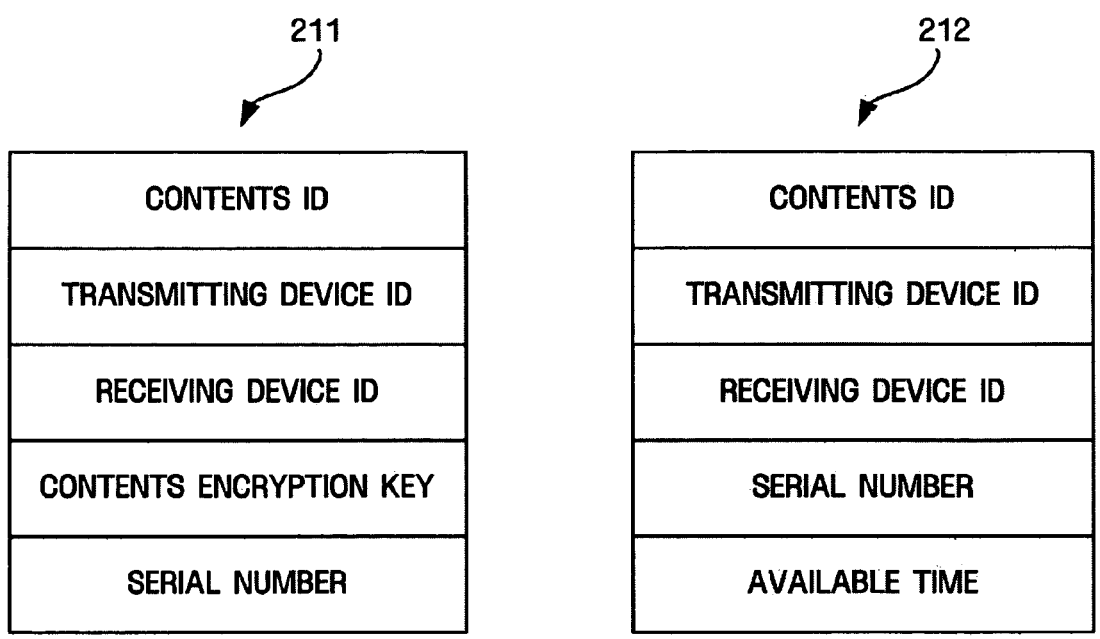
FIG. 5 is a diagram showing a configuration of a temporary rights object according to an exemplary embodiment of the invention.

FIG. 5 is a diagram showing the configuration of the temporary rights object according to an exemplary embodiment of the invention. Reference numeral 211 represents a temporary rights object that is first transmitted, and reference numeral 212 represents a temporary rights object that is transmitted after other temporary rights objects are transmitted. The rights object 211 is a first rights object that is provided to a device, which receives the temporary rights objects. The rights object 211 can include a key, extracted from the rights object (210 in FIG. 3), that can decrypt the encrypted contents object. Each of the subsequent rights objects 211, 212, 213, 214, 215 includes the usage period for the contents object.

The device that receives the rights object having the configuration indicated by 211 can decrypt the contents using the contents encryption key, and can play the contents using a serial number and a corresponding temporary rights object 212. At this time, a series of rights objects that are provided by the first device (110 of FIG. 3) specify a transmitting device identifier (ID) and a receiving device identifier (ID), and thus the rights objects can be used only in the second device (120 of FIG. 3). The second device (120 of FIG. 3) cannot retransmit the rights objects to other devices.

Alternatively, the temporary rights object may include available time information, in addition to the configuration indicated by 211 (the contents ID, the transmitting device ID, the receiving device ID, the contents encryption key, the serial number).

In this exemplary embodiment, the term "unit", "module" or "table" represents software and hardware constituent elements, such as a field programmable gate array (FPGA) or an application specific integrated circuit (ASIC). The module serves to perform some functions but is not limited to software or hardware. The module may reside in an addressable storage medium. Alternatively, the module may be provided to reproduce one or more processors.

Therefore, examples of the module include elements, such as software elements, object-oriented software elements, class elements, and task elements, processes, functions, attributes, procedures, subroutines, segments of program code, drivers, firmware, microcode, circuits, data, databases, data structures, tables, arrays, and parameters. The elements and the modules may be combined with other elements and modules or divided into additional elements and modules. In addition, the elements and the modules may be provided to reproduce one or more central processing units in a device.

Figure 6:
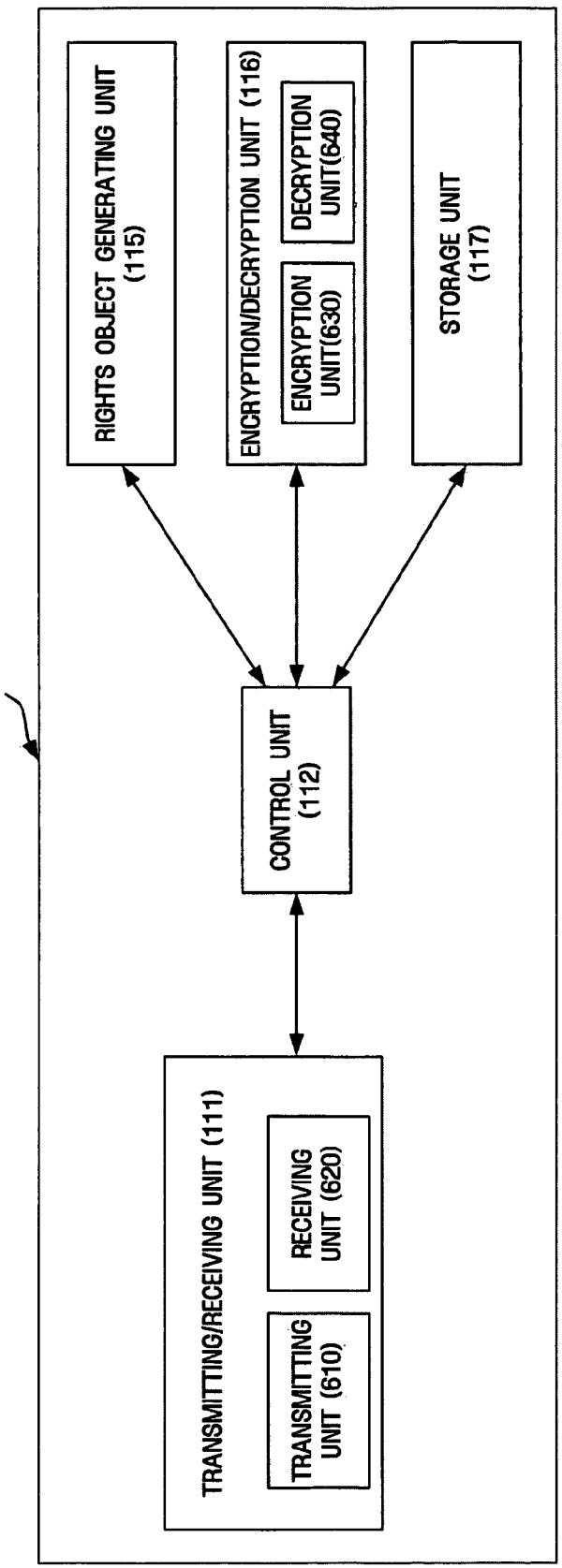
FIG. 6 is a diagram showing a configuration of a device according to an exemplary embodiment of the invention.

FIG. 6 is a diagram showing the configuration of the device according to an exemplary embodiment of the invention. A transmitting/receiving unit 111 receives the rights objects from the rights issuer or transmits the rights objects to other external devices. At this time, the rights objects that are transmitted to other devices are the temporary rights objects generated by a rights object generating unit 115. The rights object generating unit 115 generates the temporary rights objects shown in FIG. 5 from the rights object received from the rights issuer through the transmitting/receiving unit 111 so as to be used by other devices.

An encryption/decryption unit 116 decrypts the rights object and encrypts the temporary rights objects again. At this time, a key that is used to encrypt the temporary rights objects allows the rights object generating unit 115 to form the temporary rights objects. A storage unit 117 stores the rights object received from the rights issuer and allows the rights object generating unit 115 to generate the temporary rights objects. In addition, the storage unit 117 stores the generated temporary rights objects, and allows a control unit 112 to transmit the temporary rights objects as times passes.

The representative device (110 of FIG. 3) generates and transmits the temporary rights objects. Specifically, in order to provide the temporary usage right for the contents object to other devices, the representative device generates the rights object 211 that grants the usage right for the contents object for a short time using the internal rights object generating unit 115 and provides the generated rights object 211 to other devices through the transmitting/receiving unit 111. Here, the control unit 112 successively provides a series of rights objects 211, 212, 213, 214, 215 for play of the contents object one time.

The transmitting/receiving unit 111 may be divided into a transmitting unit 610 and a receiving unit 620. Similarly, the encryption/decryption unit 116 may be divided into an encryption unit 630 and a decryption unit 640.

Figure 7:
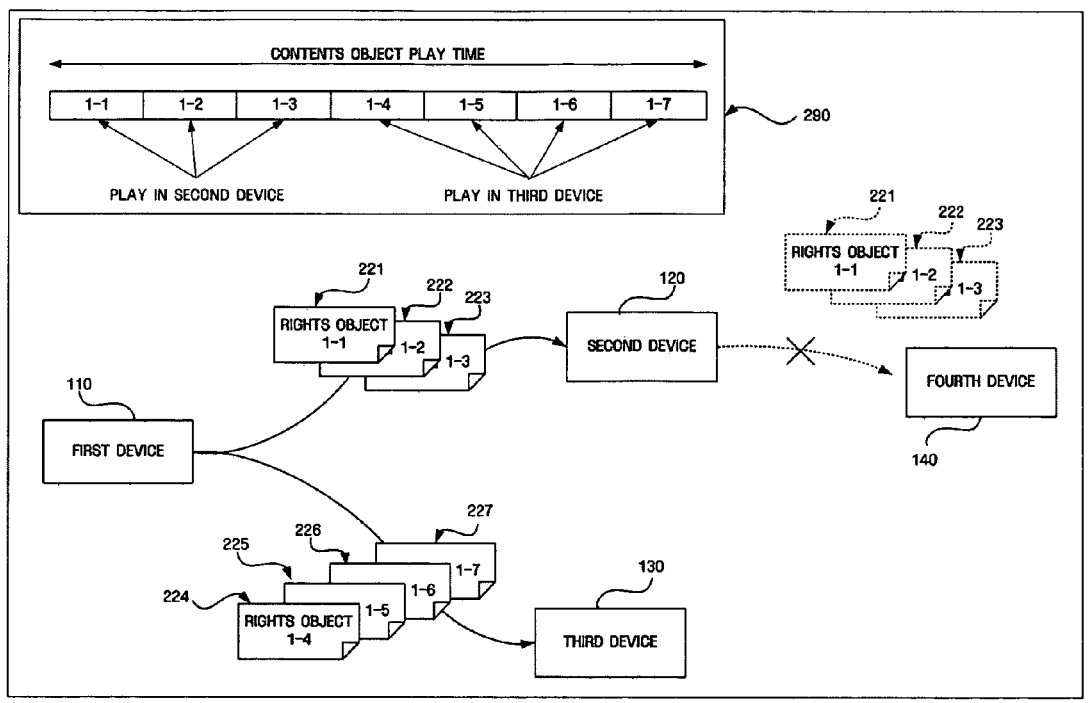
FIG. 7 is a diagram showing a case where a plurality of devices use contents using a temporary rights object according to an exemplary embodiment of the invention.

FIG. 7 is a diagram showing a case where a plurality of devices use the contents using the temporary rights objects according to an exemplary embodiment of the invention.

It is assumed that the first device 110 is a representative device that manages the rights object, and the second device 120 and the third device 130 are devices that play the contents. In order for the second device 120 to temporarily play the contents for a predetermined time, the user transmits the temporary rights objects 221, 222, and 223 to the second device 120 using the first device 110.

After the predetermined time passes, when the user wants to play the contents using the third device 130, the first device 110 stops to transmit the temporary rights objects to the second device 120, and transmits temporary rights objects 224, 225, 226, and 227 to the third device 130. The flows of the play time of the contents by the second device 120 and the third device 130 are the same as that indicated by 290.

The second device 120 cannot transmit the received temporary rights objects to the fourth device 140. This is because the temporary rights objects are revoked when their available periods lapse such that the temporary rights objects are not used by other devices.

The available time of each of the temporary rights objects may be set very short. Then, it is possible to prevent the device, which receives the temporary rights objects, from misusing temporary rights objects. Therefore, it is possible to limit the second device 120 to no longer use the temporary rights objects when the second device 120 loses the usage right. In addition, it is possible to limit the second device 120 to share the usage right of the contents with the third person.

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects. The scope of the present invention is defined by the appended claims rather than by the description preceding them, and all changes and modifications that fall within metes and bounds of the claims, or equivalents of such metes and bounds are therefore intended to be embraced by the claims.

According to an exemplary embodiment of the invention, the contents can be protected and simultaneously the usability of the rights object can be improved.

According to an exemplary embodiment of the invention, the specified user can temporarily provide the rights of his/her contents to the users of other devices and limit the use scope of the rights provided, thereby using the contents while protecting the contents.

What is claimed is:

1. A method of temporarily using Digital Rights Management (DRM) contents, the method comprising:

receiving a rights object including information required for using the contents;

converting the rights object into a first temporary rights object and a second temporary rights object which are to be successively used for a temporary use of portions of the contents;

transmitting, to an unauthorized device, the first temporary rights object, which is a temporary usage rights object required for using a first part of the contents and comprises an encryption key required for decrypting the contents, and the second temporary rights object, which is a temporary usage rights object required for using a second part of the contents; and decrypting the first part of the contents and the second part of contents with the encryption key transmitted with the first temporary rights object, wherein the first temporary rights object and the second temporary rights object allow use of the contents for a predetermined time.

2. The method of claim 1, wherein the first temporary rights object comprises identification information on the contents and an identifier of the unauthorized device.

3. The method of claim 1, wherein the second temporary rights object is the temporary usage rights object required for using the second part of the contents for a predetermined period after the first part of the contents is used with the first temporary rights object.

4. The method of claim 1, wherein the unauthorized device deletes at least one of the first temporary rights object and the second temporary rights object after a corresponding one of the first temporary rights object and the second temporary rights object is used.

5. The method of claim 1, wherein the first temporary rights object or the second temporary rights object is not used by devices other than the unauthorized device.

6. The method of claim 1, wherein the predetermined time is a fraction of a play time of the contents.

7. A method of temporarily using Digital Rights Management (DRM) contents, the method comprising:
receiving a rights object including information required for using the contents;
converting the rights object into a first temporary rights object and a second temporary rights object which are to be successively used for a temporary use of portions of the contents; and
transmitting the first temporary rights object and the second temporary rights object to an unauthorized device,
wherein the first temporary rights object and the second temporary rights object allow use of the contents for a predetermined time,
the first temporary rights object comprises a key with which the unauthorized device decrypts the contents,
the second temporary rights object comprises a usage time period, during which the unauthorized device plays the decrypted contents by using the second temporary rights object, and
when each of the first temporary rights object and the second temporary rights object is individually used, the contents are not usable.

8. An apparatus for temporarily using Digital Rights Management (DRM) contents, the apparatus comprising:
a receiving unit which receives a rights object including information required for using contents;
a rights object generating unit which converts the rights object into a first temporary rights object and a second temporary rights object which are to be successively used for a temporary use of portions of the contents;
a control unit which performs a control such that an unauthorized device successively uses the first temporary rights object and the second temporary rights object;
a transmitting unit which transmits the first temporary rights object which is a temporary usage rights object required for using a first part of the contents and comprises an encryption key required for decrypting the contents, and the second temporary rights object which is a temporary usage rights object required for using a second part of the contents, to the unauthorized device according to the control of the control unit; and
a decryption processor which decrypts the first part of the contents and the second part of the contents with the encryption key transmitted with the first temporary rights object,
wherein the first temporary rights object and the second temporary rights object allow use of the contents for a predetermined time.

9. The apparatus of claim 8, wherein the first temporary rights object comprises identification information on the contents and an identifier of the unauthorized device.

10. The apparatus of claim 8, wherein the second temporary rights object is the temporary usage rights object required for using the second part of the contents for a predetermined period after the first part of the contents is used with the first temporary rights object.

11. The apparatus of claim 8, wherein the unauthorized device deletes at least one of the first temporary rights object and the second temporary rights object after a corresponding one of the first temporary rights object and the second temporary rights is used.

12. The apparatus of claim 8, wherein the first temporary rights object or the second temporary rights object is not used by devices other than the unauthorized device.

13. An apparatus for temporarily using Digital Rights Management (DRM) contents, the apparatus comprising:
a receiving unit which receives a rights object including information required for using contents;
a rights object generating unit which converts the rights object into a first temporary rights object and a second temporary rights object which are to be successively used for a temporary use of portions of the contents;
a control unit which performs a control such that an unauthorized device successively uses the first temporary rights object and the second temporary rights object; and
a transmitting unit which transmits the first temporary rights object and the second temporary rights object to the unauthorized device according to the control of the control unit,
wherein the first temporary rights object and the second temporary rights object allow use of the contents for a predetermined time,
the first temporary rights object comprises a key with which the unauthorized device decrypts the contents,
the second temporary rights object comprises a usage time period, during which the unauthorized device plays the decrypted contents by using the second temporary rights object, and
when each of the first temporary rights object and the second temporary rights object is individually used, the contents are not usable.

14. A method of temporarily using Digital Rights Management (DRM) contents, the method comprising:
receiving a rights object including information required for using the contents;
converting the rights object into a number N of temporary rights objects comprising first, second, and third to Nth temporary rights objects, each of which is to be successively used for a temporary use of a corresponding first, second, and third to Nth part of the contents for a predetermined time;
transmitting, to an unauthorized device, a first temporary rights object, which is a temporary usage rights object required for using a first part of the contents and comprises an encryption key, and each of the second, and third to Nth temporary rights objects, which are temporary usage rights objects required for using the corresponding second, and third to Nth parts of the contents;
decrypting the first, second, third, and third to Nth part of the contents with the encryption key transmitted with the first temporary rights object; and
playing, by the unauthorized device, the contents by successively using the first, second, and third to Nth temporary rights objects.

15. The method of claim 14, further comprising:
determining the number N of temporary rights objects to use an entire contents for a playing time based on a quotient of the playing time and the predetermined time; and
converting the rights object into the determined number of temporary rights objects each allowing the temporary use of the contents for the predetermined time.

16. The method of claim 15, further comprising:
transmitting the determined number of the temporary rights objects successively to the unauthorized device; and
playing the entire contents by successively using the transmitted temporary rights objects.

* * * * *